United States Patent
Jackson et al.

(10) Patent No.: US 6,276,400 B1
(45) Date of Patent: Aug. 21, 2001

(54) CORROSION RESISTANT POWDER COATED METAL TUBE AND PROCESS FOR MAKING THE SAME

(75) Inventors: Timothy E. Jackson, Lake Orion; Tao Nie, Rochester Hills, both of MI (US); Steve Obbish, Findlay, OH (US); John F. Schloemp, II, North Baltimore, OH (US); Robert Church, Findlay, OH (US); Michael W. Boles, Orion, MI (US); Gary O. Klinger, Rochester Hills, MI (US); Christopher R. Terry, Leonard, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/328,146

(22) Filed: Jun. 8, 1999

(51) Int. Cl.[7] .................................................. F16L 9/14
(52) U.S. Cl. ........................ 138/143; 138/141; 138/137
(58) Field of Search .................................... 138/143, 141, 138/137, 139, 140, DIG. 1

(56) References Cited

U.S. PATENT DOCUMENTS

| | | | |
|---|---|---|---|
| 3,070,132 | 12/1962 | Sheridan | 138/118 |
| 3,166,688 | 1/1965 | Rowand et al. | 138/103 X |
| 3,473,087 | 10/1969 | Slade | 138/103 X |
| 3,506,155 | 4/1970 | Auer | 220/86.2 |
| 3,561,493 | 2/1971 | Maillard et al. | 138/141 |
| 3,577,935 | 5/1971 | Reinhart et al. | 425/192 R |
| 3,692,889 | 9/1972 | Hetrich | 264/503 |
| 3,751,541 | 8/1973 | Hegler | 264/508 |

(List continued on next page.)

FOREIGN PATENT DOCUMENTS

| | | |
|---|---|---|
| 1779905 | 2/1972 | (DE) . |
| 2906317 | 8/1979 | (DE) . |
| 3821723 | 9/1989 | (DE) . |
| 3827092 | 9/1989 | (DE) . |

(List continued on next page.)

OTHER PUBLICATIONS

Atochem, Inc., *Safety Data Sheet for ADELFON A*, 2 pp., prior to Nov. 1992.
James M. Margolis, Editor, *Conductive Polymers and Plastics*, ch. 4, pp. 119–124 (Chapman & Hall, New York), 1989.
Central Glass Co., Ltd., *Flexible Fluoroplastic CEFRAL Soft*, pp. 1–20 (date unavailable).
Kirk–Othmer, *Encyclopedia of Chemical Technology*, 3d ed., vol. 18, pp. 406–425 (John Wiley & Sons, New York) (1982).

(List continued on next page.)

*Primary Examiner*—Patrick Brinson
(74) *Attorney, Agent, or Firm*—Robert P. Seitter

(57) ABSTRACT

A corrosion resistant tube comprises a metal tube having an outer surface. A zinc layer is electrostatically bonded to the outer surface, wherein the zinc layer is selected from the group consisting of powdered zinc, powdered zinc nickel alloys, powdered zinc cobalt alloys, and powdered zinc aluminum alloys. Optionally, one or more polymeric layers may be electrostatically bonded to the zinc layer, or to a surface treatment layer, wherein the polymeric layer(s) comprises powdered thermoplastic materials selected from the group consisting of powdered nylons, powdered fluoropolymers, powdered polyesters, and mixtures thereof. Optionally, the polymeric layer(s) may be electrostatically bonded directly to the outer surface.

A process for producing corrosion resistant tubing comprises the steps of: electrostatically charging aerated particles of a powdered material in a fluidizing chamber; conveying grounded metal tubing through the charged particles, thereby uniformly coating the tubing outer surface; and heating the coated tubing.

60 Claims, 5 Drawing Sheets

U.S. PATENT DOCUMENTS

| | | | |
|---|---|---|---|
| 3,791,915 | 2/1974 | Goehring et al. | 428/476.3 |
| 3,828,112 | 8/1974 | Johansen et al. | 138/125 X |
| 3,838,713 | 10/1974 | Tubbs | 139/109 |
| 3,907,955 | 9/1975 | Viennot | 264/105 |
| 4,059,847 | 11/1977 | Phillips et al. | 138/103 X |
| 4,136,143 | 1/1979 | Lupke et al. | 264/508 |
| 4,211,595 | 7/1980 | Samour | 138/137 |
| 4,218,517 | 8/1980 | Van Ooij | 138/143 X |
| 4,243,724 | 1/1981 | Strutzel et al. | 138/137 X |
| 4,244,914 | 1/1981 | Ranalli et al. | 138/137 X |
| 4,272,585 | 6/1981 | Strassel | 138/137 X |
| 4,273,798 | 6/1981 | Scheiber | 427/476 |
| 4,289,727 | 9/1981 | Herrington, Jr. | 264/514 |
| 4,303,457 | 12/1981 | Johansen et al. | 138/123 |
| 4,330,017 | 5/1982 | Satoh et al. | 139/126 |
| 4,371,583 | 2/1983 | Nelson | 428/358 |
| 4,424,834 | 1/1984 | Sumi et al. | 138/121 |
| 4,448,748 | 5/1984 | Radtke et al. | 420/514 |
| 4,455,204 | 6/1984 | Pieslak et al. | 138/143 X |
| 4,496,444 | 1/1985 | Bagnulo | 138/103 X |
| 4,500,577 | 2/1985 | Satake et al. | 138/143 |
| 4,501,629 | 2/1985 | Satzler | 156/149 |
| 4,588,546 | 5/1986 | Feil et al. | 264/510 |
| 4,601,948 | 7/1986 | Lancaster et al. | 428/349 |
| 4,606,953 | 8/1986 | Suzuki et al. | 138/143 |
| 4,614,208 | 9/1986 | Skarelius | 138/103 |
| 4,659,625 | 4/1987 | Decroly et al. | 428/412 |
| 4,675,780 | 6/1987 | Barnes et al. | 138/125 X |
| 4,685,090 | 8/1987 | Krevor | 138/137 X |
| 4,706,713 | 11/1987 | Sadamitsu et al. | 138/137 |
| 4,710,337 | 12/1987 | Nordstrom | 264/508 |
| 4,732,632 | 3/1988 | Pieslak et al. | 156/86 |
| 4,758,455 | 7/1988 | Campbell et al. | 138/125 X |
| 4,762,589 | 8/1988 | Akiyama et al. | 138/137 X |
| 4,800,109 | 1/1989 | Washizu | 138/137 X |
| 4,853,297 | 8/1989 | Takahashi et al. | 138/139 X |
| 4,880,036 | 11/1989 | Kitami et al. | 138/137 |
| 4,885,215 | 12/1989 | Yoshioka et al. | 138/143 X |
| 4,887,647 | 12/1989 | Igarashi et al. | 138/126 |
| 4,907,625 | 3/1990 | Ito et al. | 138/126 |
| 4,907,830 | 3/1990 | Sasa et al. | 285/91 |
| 4,944,972 | 7/1990 | Blembereg | 428/35.2 |
| 4,948,643 | 8/1990 | Mueller | 428/36.6 |
| 4,984,604 | 1/1991 | Nishimura | 138/126 |
| 4,990,383 | 2/1991 | Bergstrom et al. | 138/146 X |
| 5,019,309 | 5/1991 | Brunnhofer | 264/103 |
| 5,038,833 | 8/1991 | Brunnhofer | 138/137 |
| 5,039,743 | 8/1991 | Machado | 525/92 B |
| 5,043,389 | 8/1991 | Gergen et al. | 525/179 |
| 5,076,329 | 12/1991 | Brunnhofer | 138/137 |
| 5,080,405 | 1/1992 | Sasa et al. | 285/315 |
| 5,082,511 | 1/1992 | Farina et al. | 148/257 |
| 5,084,518 | 1/1992 | George et al. | 525/184 |
| 5,112,692 | 5/1992 | Strassel et al. | 428/421 |
| 5,129,429 | 7/1992 | Winter et al. | 138/121 |
| 5,135,976 | 8/1992 | Van Helden et al. | 524/114 |
| 5,141,427 | 8/1992 | Hegler et al. | 425/233 |
| 5,142,782 | 9/1992 | Martucci | 138/109 |
| 5,143,122 | 9/1992 | Adkins | 138/125 X |
| 5,148,837 | 9/1992 | Agren et al. | 138/121 |
| 5,167,259 | 12/1992 | Brunnhofer | 138/137 |
| 5,170,011 | 12/1992 | Martucci | 138/118 X |
| 5,219,002 | 6/1993 | Stenger et al. | 138/137 X |
| 5,219,003 | 6/1993 | Kerschbaumer | 138/137 |
| 5,258,213 | 11/1993 | Mugge et al. | 428/36.91 |
| 5,277,228 | 1/1994 | Yamanashi | 138/143 |
| 5,284,184 | 2/1994 | Noone et al. | 138/121 |
| 5,313,987 | 5/1994 | Rober et al. | 138/137 |
| 5,362,529 | 11/1994 | Mugge et al. | 428/35.7 |
| 5,362,570 | 11/1994 | Rober et al. | 428/35.7 X |
| 5,373,870 | 12/1994 | Derroire et al. | 138/125 |
| 5,380,385 | 1/1995 | Derroire et al. | 138/125 |
| 5,383,087 | 1/1995 | Noone et al. | 138/137 X |
| 5,389,410 | 2/1995 | Mugge et al. | 428/34.1 |
| 5,390,808 | 2/1995 | Choma et al. | 220/86.2 |
| 5,404,915 | 4/1995 | Mugge et al. | 138/137 |
| 5,425,817 | 6/1995 | Mugge et al. | 138/137 |
| 5,427,831 | 6/1995 | Stevens | 428/36.2 |
| 5,437,311 | 8/1995 | Reynolds | 138/115 |
| 5,449,024 | 9/1995 | Rober et al. | 138/137 |
| 5,460,771 | 10/1995 | Mitchell et al. | 264/508 |
| 5,469,892 | 11/1995 | Noone et al. | 138/121 |
| 5,472,784 | 12/1995 | Rober et al. | 428/421 |
| 5,474,822 | 12/1995 | Rober et al. | 138/118 |
| 5,478,620 | 12/1995 | Mugge et al. | 138/118.1 X |
| 5,500,263 | 3/1996 | Rober et al. | 138/137 X |
| 5,520,223 | 5/1996 | Iorio et al. | 138/140 |
| 5,524,673 | 6/1996 | Noone et al. | 138/103 |
| 5,538,039 | 7/1996 | Harde et al. | 137/592 |
| 5,554,425 | 9/1996 | Krause et al. | 138/118 X |
| 5,560,398 | 10/1996 | Pfleger | 138/121 |
| 5,566,720 | 10/1996 | Cheney et al. | 138/137 |
| 5,570,711 | 11/1996 | Walsh | 138/137 |
| 5,590,691 | 1/1997 | Iorio et al. | 138/146 |
| 5,653,266 | 8/1997 | Reynolds et al. | 138/137 |
| 5,678,611 | 10/1997 | Noone et al. | 138/137 |
| 5,679,425 | 10/1997 | Plumley | 138/126 X |
| 5,706,864 | 1/1998 | Pfleger | 138/121 |
| 5,716,684 | 2/1998 | Stoeppelmann et al. | 138/137 |
| 5,718,957 | 2/1998 | Yokoe et al. | 138/118.1 X |
| 5,743,304 | 4/1998 | Mitchell et al. | 138/137 |
| 5,763,034 | 6/1998 | Nishino | 138/137 X |
| 5,865,218 | 2/1999 | Noone et al. | 138/137 |
| 5,884,671 | 3/1999 | Noone et al. | 138/137 |
| 5,884,672 | 3/1999 | Noone et al. | 138/137 |
| 5,894,865 | 4/1999 | Winter et al. | 138/121 |
| 5,901,755 | 5/1999 | Winter et al. | 138/121 |
| 6,003,562 | * 12/1999 | Iorio et al. | 138/141 X |

FOREIGN PATENT DOCUMENTS

| | | |
|---|---|---|
| 9001467 | 4/1990 | (DE) . |
| 4001125 | 12/1990 | (DE) . |
| 4001126 | 12/1990 | (DE) . |
| 9007303 | 12/1990 | (DE) . |
| 3942354 | 6/1991 | (DE) . |
| 4006870 | 7/1991 | (DE) . |
| 4025301 | 4/1992 | (DE) . |
| 4137430 | 5/1993 | (DE) . |
| 4214383 | 9/1993 | (DE) . |
| 9400522 | 1/1994 | (DE) . |
| 9319879 | 4/1994 | (DE) . |
| 9402180 | 5/1994 | (DE) . |
| 0164766 | 12/1985 | (EP) . |
| 0436923 | 7/1991 | (EP) . |
| 0465252 | 1/1992 | (EP) . |
| 0551094 | 7/1993 | (EP) . |
| 0569101 | 11/1993 | (EP) . |
| 0117669 | 9/1994 | (EP) . |
| 0816067 | 1/1998 | (EP) . |
| 2114550 | 6/1972 | (FR) . |
| 2577168 | 8/1986 | (FR) . |
| 2577564 | 8/1986 | (FR) . |
| 2579290 | 9/1986 | (FR) . |
| 2688858 | 9/1993 | (FR) . |
| 2747175 | 10/1997 | (FR) . |
| 2204376 | 11/1988 | (GB) . |
| 2211266 | 6/1989 | (GB) . |
| 46-9667 | 3/1971 | (JP) . |
| 55-97933 | 7/1980 | (JP) . |
| 60-32627 | 2/1985 | (JP) . |
| 93/25835 | 12/1993 | (WO) . |

| | | |
|---|---|---|
| 94/07673 | 4/1994 | (WO) . |
| 94/09302 | 4/1994 | (WO) . |
| 94/09303 | 4/1994 | (WO) . |
| 95/21051 | 8/1995 | (WO) . |
| 95/27866 | 10/1995 | (WO) . |
| 95/30105 | 11/1995 | (WO) . |
| 97/44186 | 11/1997 | (WO) . |

OTHER PUBLICATIONS

Shell Chemical Company, *Kraton Rubber—Compounds Properties Guide*, prior to Apr., 1994.

Shell Chemical Company, *Kraton Thermoplastic Rubber—Processing & Fabricating Kraton Thermoplastic Rubber Compounds*, pp. 1–26 (Apr. 1988).

Shell Chemical Company, *Kraton Rubber Automotive Compound Characteristics*, prior to Apr., 1994.

Shell Chemical Company, *Kraton Thermoplastic Rubber—Typical Properties 1990*, pp. 1–11 (Feb. 1990).

Advanced Elastomer Systems, *Material Safety Data—Santoprene Thermoplastic Rubber FR Grades*, pp. 1–5 (Dec. 1, 1990).

Central Glass Co., Ltd., *Material Safety Data Sheet—XUA–2U*, pp. 1–2 (Mar. 18, 1991).

Shell Chemical Company, *Material Safety Data Sheet—Kraton G7455X Thermoplastic Rubber*, pp. 1, 3, 5 (Aug. 10, 1990).

SAE Standard, *Nonmetallic Air Brake System Tubing—SAE J844*, pp. 203–208 (Jun. 1990).

International Plastics Selector, *Plastics Digest—Thermoplastics and Thermosets*, ed. 14, vol. 2, pp. 216–219, 1283–1284 (1993).

EMS—American Grilon Inc., *EMS Engineering Polymers—Product Data Bulletin—Grilamid L25FVS40—GRILAMID L25F10*, prior to Feb., 1993.

Huls America Inc., *Product Information—Vestamid Nylon 12*, prior to Jan. 1995.

Donald V. Rosato, David P. D Mattia, & Dominick, V. Rosato, *Designing with Plastic & Composites: A Handbook*, pp. 210–223 (Van Nostrand Reinhold, New York) (1991).

Advanced Elastomer Systems, *Santoprene Thermoplastic Rubber—Product Data Sheet—251–80* (Nov. 1991).

Advanced Elastomer Systems, *Santoprene Thermoplastic Rubber—Fluid Resistance*, pp. 1–12 (1992).

DSM Thermoplastic Elastomers Inc., *Sarlink 1000 Series—Material Safety Data Sheet*, pp. 1–4 (Jan. 14, 1992).

Novacor Chemicals Inc., *Sarlink Thermoplastic Elastomers—The Alternative TPEs*, prior to Apr., 1994.

Novacor Chemicals Inc., *Data Sheet—Sarlink 1570—Fuel Resistant Thermoplastic Elastomer for Marine Hose Applications* (data sheets for other products included) (Nov. 1989).

ASTM Standard B 750, *Standard Specification for Zinc—5 Aluminum—Mischmetal Alloy (UNS Z38510) in Ingot Form for Hot–Dip Coatings*, pp. 669–670, 1988.

State of California—Air Resources Board, *Public Hearing to Consider Amendments . . . Regarding Evaporative Emissions Standards . . .*, pp. 1–2, A1–A4, B1–B43 (Aug. 9, 1990).

DuPont Corporation, *Tefzel Fluoropolymer—Safety in Handling and Use*, pp. 1–3, 20–21, 35–37, prior to Apr., 1992.

Vichem Corporation, *Vinyl Compounds—Material Safety Data Sheet—V220–85E–7261* (May 1990).

ASTM, *Designation: D 256—93a—Standard Test Methods for Determining the Pendulum Impact Resistance of Notched Specimens of Plastics*, pp. 1–18 (1993).

Joseph E. Shigley & Larry D. Mitchell, *Mechanical Engineering Design*, p. 177, 4th ed. (McGraw–Hill Book Company, New York) (1983).

Kenneth Wark, *Thermodynamics*, p. 15, 4th ed. (McGraw–Hill Book Company, New York) (1983).

Eugene A. Avallone & Theodore Baumeister III, *Marks' Standard Handbook for Mechanical Engineers*, pp. 1–24, 9th ed. (McGraw–Hill Book Company, New York) (1978).

ICI Americas Inc.—LNP Engineering Plastics, *A Guide to Statically Conductive Advanced Material Composites—Bulletin 223–889*, Aug. 1989.

Creanova Engineering Plastics, *VESTAMID coated steel tubing processing recommendations* (Jan. 1998).

Morton International Inc.—Morton Powder Coatings, *Powder Coating Data Sheet—Corvel Zinc Rich Gray 13–7004* (including data sheets for other colors) (1998).

Morton International Inc.—Morton Powder Coatings, *Corvel Powder Coatings for Automotive Underhood/Underbody Applications*, (data unavailable).

Morton International Inc.—Morton Powder Coatings, *Technology Brief #18—Salt Spray Resistance of Powder Coatings* (Jun. 1997).

Morton International Inc.—Morton Powder Coatings, *Technology Brief #5—Improved Corrosion Protection* (Aug. 1990).

Morton International Inc.—Morton Powder Coatings, *Morton—Stock Product Selector 1998*.

Crosslink Powder Coatings Inc., *Material Safety Data Sheet for "Crosslink"—Product #19915*, pp. 1–2 (1998).

Herberts Powder Coatings Inc., *Fluorostar PC—Kynar 500PC resin based—Architectural Powder Coatings* (date unavailable).

Crosslink Powder Coatings Inc., *Technical Data Sheet—Series 3000—Flexibility, Corrosion and Chemical Resistance*, pp. 1–3 (Mar. 6, 1998).

Creanova Spezialchemie GmbH (A Huls Group Company), *Product Information—VESTOSINT—PA 12 Coating Powder* (1998).

Herberts Powder Coatings Inc., *Technical Information Sheet—Burnished Slate (ID# 8019S26E)* (Mar. 16, 1998).

Electrostatic Technology Inc., *Powder Coating—For Linear Substrates* (1990).

* cited by examiner

| POWDER COAT TESTING | | | | |
|---|---|---|---|---|
| SAMPLE IDENTIFICATION | COATING THICKNESS AVG. (μm) | ENDFORM FLARE EVALUATION | PAINT ADHESION EVALUATION | HCl EMERSION 5.0 N. CONC. |
| PA 11 | 103.38 | PASSED | NO PEELING | 216 HRS PASSED |
| PA 12 | 140.89 | PASSED | NO PEELING | 216 HRS PASSED |
| CROSS LINK 3000 (RAW) | 95.00 | PASSED | NO PEELING | 216 HRS PASSED |
| CROSS LINK 3000 (PLATED) | 110.89 | PASSED | NO PEELING | 216 HRS PASSED |
| CROSS LINK 3000 (PRIMER) | 92.50 | PASSED | NO PEELING | 216 HRS PASSED |
| HERBERTS (RAW) | 88.28 | PASSED | NO PEELING | 216 HRS PASSED |
| HERBERTS (PLATED) | 62.80 | PASSED | NO PEELING | 216 HRS PASSED |
| HERBERTS (PRIMER) | 61.56 | PASSED | NO PEELING | 216 HRS PASSED |
| ALUMINUM WIRE | 58.38 | N/A | N/A | 216 HRS PASSED |
| COPPER WIRE | 99.92 | N/A | N/A | 216 HRS PASSED |

FIGURE 7

CORROSION RESISTANT POWDER COATED METAL TUBE AND PROCESS FOR MAKING THE SAME

BACKGROUND OF THE INVENTION

This invention relates to a metal tube, and more particularly to a metal tube having a corrosion resistant powder coated outer surface.

Metal pipes often have their outer surfaces covered with a protective coating. These pipes are used for conveying brake fluids, fuel and the like in a motor vehicle. As such, these pipe lines are located under the body of the vehicle. Since they are used in such a harsh environment, the pipes are required to have a high degree of corrosion resistance, scratch resistance, impact strength and mechanical wear resistance. In cold climates, it is not unusual to encounter road salt sprinkled onto road surfaces in order to prevent icing on the road surfaces and the inherent dangers caused thereby. The popularity of spreading road salt has created a serious problem of metal pipe corrosion. The pipes are also vulnerable to damage or wear from stones or mud spattered by rotating wheels of the vehicle. Therefore, it is necessary that the pipes attached to the underbody of the vehicle be coated so as to resist both chemical corrosion and mechanical damage or wear.

A double-rolled steel pipe has been proposed that is made by rolling a steel strip or hoop twice and brazing its longitudinal edges by means of a copper plating layer, or a seam welded steel pipe, where the pipe has an outer surface coated with an electroplated zinc film. The zinc film has an outer surface coated with a relatively thin special chromate film having, for example, an olive color. Chromate is typically used to enhance the adhesion of the subsequent layer by making the surface rougher. The chromate film has an outer surface coated with a fluorinated resin film. The fluorinated resin film is formed by impregnating the chromate film with a dispersion of polyvinyl fluoride immediately after the formation of the chromate film when it is still in the state of a gel, and drying them under heat, so that the fluorinated resin film may form an intimate bond with the chromate film. When the chromate film is formed by treating the pipe with a solution, it requires large amounts of a chromium compound and an organic acid, such as formic acid, used as a reducing agent. It is necessary to supply the treating solution with the chromium compound frequently, and to renew it at regular intervals of time in order to maintain a constant film forming capacity. The waste solution, however, contains a large amount of chromium having a valence of 6, which is a toxic substance. As such, the disposal of this toxic waste solution is very costly. Although the chromate film as formed is highly resistant to corrosion, the heat to which it is exposed during the formation of the resin film deprives it of water and thereby makes it brittle. Any plastic deformation of the pipe, such as may result from bending or double flaring, forms fine cracks in the chromate film which lowers its rustproofing properties.

It has also been proposed to provide a corrosion resistant pipe where a metal pipe is provided with an outer surface coated with a zinc film, a chromate film, an intermediate layer consisting sequentially of an epoxy resin and a polyvinyl fluoride film formed one on top of another in the order listed.

A plastic-coated steel tube has also been proposed where a steel tube has an inner layer of at least one cross-linked polyolefin modified with a hydrolyzable silane and an outer unmodified or soot-blended polyolefin layer on the exposed surface of the inner layer.

A process for coating metal tubes with plastic material has also been disclosed where a fixed metal tube is heated to a temperature above the melting point of the plastic material to be employed, thereafter causing a mixture of plastic powder and air to pass through the metal tube whereby the plastic material is fritted onto the inside surface of the tube, thereafter rotating the metal tube and applying to the exterior surface thereof in a plurality of stages a plastic material, the plastic material being electrostatically sprayed onto the rotating metal tube. After each stage of electrostatically applying plastic to the outside surface of the metal tube and applying plastic material to the inside surface thereof, the plastic material is completely melted and smoothed. However, this process has several drawbacks, including that it is a batch process (as opposed to a continuous process); it requires rotation of the tube; and the cure time of the plastic material is quite slow, eg. several minutes. Thus, this process is rather inefficient, both from a cost and time standpoint.

An automobile tube line for a brake, fuel or hydraulic system has also been disclosed with an interior steel tube having a galvanized exterior layer with an additional exterior olive chromated layer which is wrapped in an additional Nylon 12 layer casing where the plastic casing is a polyamide layer applied by extrusion on top of the olive chromated layer.

A conventional method of applying a polyvinyl fluoride (PVF) or polyvinylidene fluoride (PVDF) coating onto tubing is by applying the PVF or PVDF as a paint. As such, the PVF or PVDF is carried in a solvent to form the paint. As the solvent evaporates, the paint dries, thereby leaving the PVF or PVDF coating on the tube. This is not an environmentally "friendly" practice, as much solvent vapor may be generated. Thus, complex and costly equipment is necessary for vapor recovery and post treatment.

Thus, it is an object of the present invention to provide a corrosion resistant metal tube and process for making the same which advantageously substantially eliminates volatile organic compounds, thereby substantially eliminating the need for vapor recovery. It is a further object of the present invention to provide a process which utilizes nearly 100% of the material applied to the tube, thereby advantageously substantially eliminating waste of raw material(s). Still further, it is an object of the present invention to provide such a tube and process for making the same which exhibits good adherence between the tube and a subsequent corrosion resistant layer(s). Yet further, it is an object of the present invention to provide a metal tube and process for making the same which advantageously substantially eliminates the use of chromium, thereby advantageously substantially eliminating the need for waste removal of this toxic substance. Further, it is an object of the present invention to provide a process for making such a tube which is continuous, and advantageously has a fast cure time and is cost effective.

SUMMARY OF THE INVENTION

The present invention addresses and solves the above-mentioned problems and achieves the above-mentioned objects and advantages, as well as other advantages not enumerated, by providing a corrosion resistant tube, comprising a metal tube having an outer surface. A zinc layer is electrostatically bonded to the metal tube outer surface, wherein the zinc layer is selected from the group consisting of powdered zinc, powdered zinc nickel alloys, powdered zinc cobalt alloys, powdered zinc aluminum alloys, and mixtures thereof. One or more polymeric layers may be electrostatically bonded to the zinc layer, wherein the polymeric layer comprises powdered thermoplastic materials selected from the group consisting of powdered nylons, powdered fluoropolymers, powdered polyesters, and mixtures thereof. Optionally, the polymeric layer(s) may be electrostatically bonded directly to the outer surface of the metal tube.

Further, the polymeric layer(s) may be electrostatically bonded to any type of a metal tube having an outer surface pretreated to form a surface selected from the group consisting of (but not limited to) zinc; a zinc plate with chromate; a zinc plate with phosphate and chromate; a galvanized zinc layer with phosphate and chromate; a galvanized zinc layer with chromate; zinc alloys consisting essentially of zinc and a polymeric matrix and/or zinc and an epoxy matrix; a zinc-metal blend with phosphate and chromate; a zinc-metal blend with chromate; (where the above-mentioned zinc-metal blend(s) is selected from a group consisting of zinc-nickel alloy, zinc-cobalt alloy, and zinc-aluminum alloy, and mixtures thereof); and mixtures thereof.

The inventive corrosion resistant metal tube and process for making the same advantageously substantially eliminates volatile organic compounds, thereby substantially eliminating the need for vapor recovery. The inventive continuous process utilizes nearly 100% of the material applied to the tube, thereby advantageously substantially eliminating waste of raw material(s); and is cost effective and faster than batch processes. The inventive tube and process for making the same exhibits good adherence between the tube and a subsequent corrosion resistant layer (s). The metal tube and process for making the same may also (optionally) substantially eliminate the use of chromium, thereby advantageously substantially eliminating the need for waste removal of this toxic substance.

If multiple layers of powdered polymeric material (even if of the same powdered polymeric material) are applied to the tube, this greatly reduces the probability of apertures or perforations in any one layer reaching through to the base tube, thereby providing enhanced corrosion and damage resistance.

The inventive process for producing corrosion resistant tubing comprises the steps of: aerating particles of a powdered material in a fluidizing chamber; electrostatically charging the aerated particles by ionized air which passes through a porous plate at the base of the chamber; conveying grounded metal tubing through the aerated, charged particles, whereby the charged particles uniformly coat the tubing outer surface; and heating the coated tubing.

BRIEF DESCRIPTION OF THE DRAWINGS

Other objects, features, advantages and applications of the present invention will become apparent by reference to the following detailed description and to the drawings, in which:

FIG. 7 is a table showing coating thicknesses and test results for various powdered materials.

DESCRIPTION OF THE PREFERRED AND ALTERNATIVE EMBODIMENTS

It is desirable in the present invention to provide brake lines and fuel lines, and other lines which could be damaged by the regular use of an automobile, which can meet the continuous demand of traffic conditions. Thus, these lines must have a long lasting durability of ten years or more. In such application areas, resistance to corrosion, resistance against breaking, cracking or bursting due to internal pressure, resistance to stone impact and a high corrosion resistance against winter salt are all desirable characteristics. At this time, tube lines made of steel are currently being used in a large capacity. For brake lines, double-wrap steel tubes are suitable, whereas single wall straight bead welded steel pipes are more appropriate for fuel lines.

Corrosion can be minimized by various methods, for example, by the use of a coating of protective metal such as zinc, tin, lead, nickel or copper; by the production of oxide, phosphate or similar coatings on iron and steel surfaces; by the application of protective paints; and by rendering the surface of the metal passive. Galvanizing zinc is applied to metal surfaces by dipping into a bath of molten zinc (the hot process) or zinc alloys, by electrodeposition (the electrolytic or cold process), or by metal spraying.

A further discussion of coating processes is found in U.S. Pat. No. 5,590,691, which is incorporated herein by reference in its entirety.

The corrosion resistant tubing 10 according to the present invention includes a metal tube or pipe 12. The metal tube 12 may be welded steel tube, brazed steel tube, aluminum, copper or stainless steel. The process of the present invention is capable of applying a single or multi-layer coating over any rigid or semi-rigid tubular material. Of particular interest in the present invention is the mechanical durability and corrosion resistance advantage obtained with carbon steel in either a welded single wall or brazed double wall form of tube or piping. Application of multi-layer coatings on other materials may be of a decorative nature with some protection also being obtained, for example improved chemical resistance of the outer shell of a multi-layer coating over the underlying rigid or semi-rigid tubular material.

Figure 1:
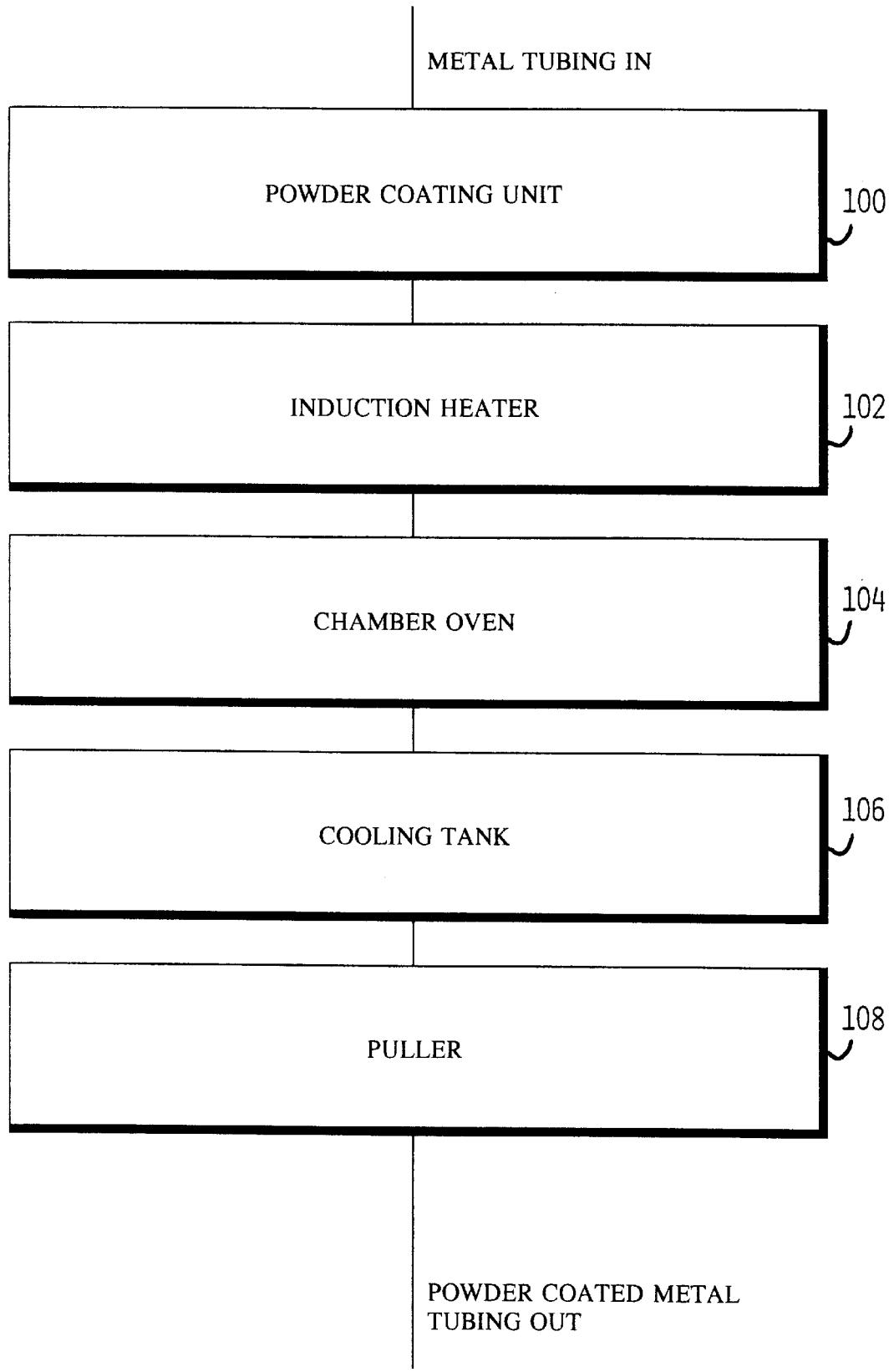
FIG. 1 is a simplified flow diagram of a process according to the present invention for powder coating a metal tube.

Referring now to FIG. 1, the metal tube 12 may be pretreated as required and/or desired through various clean and rinse stages. In addition, the pretreating of the metal surface may also include pickling to remove oxides and to improve the metal surface for deposition of a metal based coating, such as a zinc based coating that is applied by hot dip galvanization, or the preferred method of electrolytic bath coating or plating. In the alternative, previously pretreated metal tubing 12 may be supplied to the powder coating unit 100 according to the present invention. In either case, metal tubing 12 with a zinc based coating applied thereon in a range of about 0.4 mil to about 1.0 mil may be either produced or supplied for subsequent treating as will be disclosed hereinafter according to the present invention.

A process for producing corrosion resistant tubing 10 according to the present invention comprises the steps of aerating particles of a powdered material in a fluidizing chamber; and electrostatically charging the aerated particles by ionized air which passes through a porous plate at the base of the chamber. The powder coating unit 100 comprises the fluidizing chamber with the porous plate at its base.

The process further comprises the steps of conveying grounded metal tubing 12 having an outer surface 13 through the aerated, charged particles in the powder coating unit 100, whereby the charged particles uniformly coat the tubing outer surface 13. The coated tubing is then heated.

It is to be understood that any suitable powder coating unit/process may be used. However, in the preferred embodiment, an electrostatic powder coating unit 100 commercially available from Electrostatic Technology, Inc. in Branford, Conn. is used. The unit 100 includes the fluidizing chamber and porous plate at the base of the chamber, as stated above. As the powder particles become charged by ionized air, they form a cloud or veil of charged particles. When a grounded object, such as tubing 12, is conveyed through this cloud, the charged particles are attracted to it. As the particles deposit on the object, they form a uniform coating, being more attracted to exposed areas than to those already coated. As the surface becomes completely coated, the coated sections exhibit a self-limiting effect which also tends to produce a uniform thickness.

The air ionization process charges the powder without permitting the powder, the object to be coated, or the operator to come in contact with the charging media. Vortex electrostatic fluidized bed technology causes the creation of a powder cloud that flows around the tube. The vortex coating technology provides substantially perfectly concentric film builds on tubes. The vortex generators, one located at the inlet and one located at the outlet of the fluidized bed, produce the secondary particle clouds within the primary cloud which provides powder deposition of exceptional uniformity at significantly reduced voltages. The vortex generator, together with a coating bed, generates a concentric cloud of evenly charged powder around the substrate. The charged particles are attracted to the substrate equally on all surfaces as it is passed through the coater resulting in overall uniformity.

The heating step of the present invention may comprise two separate steps, namely passing the coated tubing through an induction heater 102; and then, passing the coated tubing through a chamber oven 104. The induction heater 102 quickly raises the temperature of the tubing; while the oven 104 maintains the temperature. If the powdered material used is a thermoset polymeric material, the oven 104 allows cross-linking and curing; whereas if the powdered material used is a thermoplastic polymeric material, the oven 104 allows melting and flowing.

It is to be understood that any suitable temperature and period of time within both the induction heater 102 and the oven 104 may be used, as is suitable and/or desired to achieve proper and/or desired melt/cure characteristics. However, in the preferred embodiment, the conveyance rate of the tubing is approximately 40 ft/min; the induction coil is between about 1½" and about 2" in diameter; and the time within induction heater 102 is between about 5.0 seconds and about 6.0 seconds. However, it is to be understood that the time within induction heater 102 may vary, depending upon material characteristics.

Also in the preferred embodiment, the chamber oven 104 maintains a temperature between about 400° F. and about 550° F.; and more preferably between about 450° F. and about 500° F. It is to be understood that the temperature ranges may vary, depending upon material characteristics. Also in the preferred embodiment, the tubing remains in the chamber oven 104 for a period of time ranging between about 10 seconds and about 40 seconds; and more preferably, for a period of time ranging between about 10 seconds and about 33 seconds. Again, it is to be understood that the time within chamber oven 104 may vary, depending upon material characteristics. It is to be understood that oven 104 may be heated by any suitable source, including but not limited to infrared and/or natural gas and/or heated circulated air.

The process of the present invention may further comprise the steps of passing the heated, coated tubing through a cooling tank 106 such as a water quench tank and/or a cold-air chamber; and pulling the tubing via a puller apparatus 108 while maintaining tension on the tubing. Throughout the process, a proper tension of the tubing 12 from feed to takeup should be maintained so as to minimize tube motion (up and down; and side to side) and to minimize contact with the induction coil. Further, the process of the present invention may comprise the step of conveying the coated tubing past air knives (not shown) at the end of the water quench 106 to remove any excess water from the tubing 10 before it reaches the take up reels (not shown). Still further, the process of the present invention may comprise a cutoff step (not shown) where the tubing is cut to the appropriate length or coiled as desired.

It is to be understood that the electrostatic method for powder coating tubing described hereinabove may be used to coat tubing 12 with any suitable desired powdered material; and the process may also be used to apply subsequent layers of powdered material (either the same or a different material) onto the powder coated tubing. It is also to be understood that the present inventive process may be used in combination with other conventional processes; for example, tubing 12 may be hot dipped, painted, etc. and then have a powder coated layer applied thereto; and/or, tubing 12 may be powder coated with the powdered zinc/zinc alloy and then have subsequent polymeric layers powder coated, extruded, and/or solution painted thereon. Some non-limitative examples of these variations follow.

Figure 2:
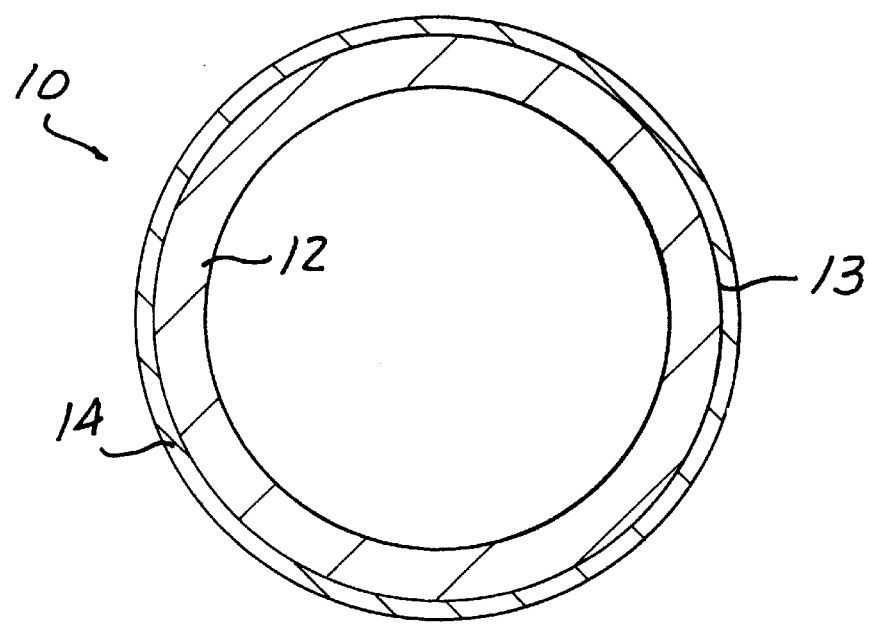
FIG. 2 is a cross-sectional view of tubing according to a first embodiment of the present invention with the layer thicknesses exaggerated for purposes of illustration.

Referring now to FIG. 2, corrosion resistant tube 10 comprises a metal tube 12 having an outer surface 13. A zinc layer 14 is electrostatically bonded to, and/or deposited on the metal tube outer surface 13. It is to be understood that the zinc layer may comprise any suitable material. However, in the preferred embodiment, the zinc layer 14 is selected from the group consisting of powdered zinc, powdered zinc nickel alloys, powdered zinc cobalt alloys, powdered zinc aluminum alloys, and mixtures thereof.

Throughout the present disclosure, it is to be understood, and believed apparent, that when it is stated that a "powdered" material is electrostatically bonded to a tube surface and/or underlying layer, it is not meant that the material remains in its powdered state. Rather, it is meant that the material originated as a powder, but through coating, heating, etc. has turned into a film coating. However, when it is specified that a "powdered" material is fed into the powder coating unit 100, it is to be understood, and believed apparent, that the material is in its powdered form at that time.

It is also to be understood that the zinc layer 14 may be applied in any suitable and/or desired thickness; however, in the preferred embodiment, the zinc layer 14 has a thickness ranging between about 10 microns and about 150 microns, preferably between about 25 microns and about 75 microns, and more preferably between about 20 microns and about 45 microns.

Some suitable powdered zinc materials are commercially available from Morton Powder Coatings, Inc. in Reading, Pa. Various Morton grades/products and representative physical characteristics thereof follow. CORVEL® Zinc Rich Gray 13-7004 is a specially formulated thermoset epoxy powder coating. This powdered coating is designed for electrostatic application; and recommended film thickness is 1.8–2.2 mils. The recommended cure schedule is 6 minutes at 375° F. (190.5° C.) metal temperature. Some typical performance characteristics include the following. The specific gravity (calculated) is 2.94. The coverage (calculated) is 65 ft$^2$/lb./mil. The particle size (Alpine Jet Sieve) using test method ASTM D 3451 (% retained) is: +200 Mesh: 0–5%; +325 Mesh: 5–30%. 60 degree gloss using test method ASTM D 523 is 65–80 units. The flexibility using test method ASTM D 522, Method B is ⅛ inch mandrel. The Taber abrasion using test method ASTM D 4060 (CS-10 wheel, 1000 gram load, 1000 cycles) is 40–60 mg loss. The impact resistance (Direct/Reverse) using test method ASTM D 2794 (⅝ inch indenter) is 160 in.lbs. The pencil hardness using test method ASTM D 3363 is H-2H (Mar); 4H–5H (Gouge). The crosshatch adhesion (2 mm cuts) using test method ASTM D 3359, Method B, is 4B–5B. The humidity resistance (unscribed) using test method ASTM D 2247 is 5800+ hours. The salt spray resistance (vertical scribe) using test method ASTM B 117 is 4000+ hours.

CORVEL® Zinc Rich Gray 13-7008 is an epoxy powder. The specific gravity (calculated) is 2.94. Coverage, square feet per pound per mil is 65. The particle size (Alpine Jet Sieve) using test method ASTM D 3451 (% retained) is: +200 Mesh: 0–5%; +325 Mesh: 5–30%. In a test conducted with electrostatic spray application using test method MPTM 13 on a Q-PANEL substrate having a cure schedule of 5 minutes at 375° F., the film thickness was 1.6–2.2 mils.

CORVEL® ECB-1363A Gray 2770 17-7006 is an epoxy powder. The specific gravity (calculated) is 1.80. Coverage, square feet per pound per mil is 107. The particle size (Alpine Jet Sieve) using test method ASTM D 3451 (% retained) is: +200 Mesh: 4 MAX%; +325 Mesh: 10–30%. In a test conducted with electrostatic spray application using test method MPTM 13 on a 3"×4"×⅛" CRS substrate with a cure schedule of 10 minutes at 450° F., the film thickness was 4.0–6.0 mils.

CORVEL® Yellow P II 40-2031 is a hybrid powder. The specific gravity (calculated) is 1.53. Coverage, square feet per pound per mil is 126. The particle size (Alpine Jet Sieve) using test method ASTM D 3451 (% retained) is: +200 Mesh: 0–15%; +325 Mesh: 30–40%. In a test conducted with electrostatic spray application using test method MPTM 13 on a Q-PANEL substrate with a cure schedule of 8 minutes at 385° F., the film thickness was 1.3–1.7 mils.

CORVEL® Red Oxide 10-4073 is an epoxy powder. The specific gravity (calculated) is 1.52. Coverage, square feet per pound per mil is 127. The particle size (Alpine Jet Sieve) using test method ASTM D 3451 (% retained) is: +200 Mesh: 0–15%; +325 Mesh: 30–40%. In a test conducted with electrostatic spray application using test method MPTM 13 on a Q-PANEL substrate with a cure schedule of 10 minutes at 400° F., the film thickness was 1.8–2.2 mils.

CORVEL® Red Primer 10-4098 is an epoxy powder. The specific gravity (calculated) is 1.42. Coverage, square feet per pound per mil is 135. The particle size (Alpine Jet Sieve) using test method ASTM D 3451 (% retained) is: +200 Mesh: 0–15%; +325 Mesh: 30–40%. In a test conducted with electrostatic spray application using test method MPTM 13 on a Q-PANEL substrate with a cure schedule of 20 minutes at 225° F., the film thickness was 1.2–1.8 mils.

CORVEL® White 10-1066 is an epoxy powder. The specific gravity (calculated) is 1.78. Coverage, square feet per pound per mil is 108. The particle size (Alpine Jet Sieve) using test method ASTM D 3451 (% retained) is: +200 Mesh: 0–8%; +325 Mesh: 15–30%. In a test conducted with electrostatic spray application using test method MPTM 13 on a Q-PANEL substrate with a cure schedule of 23 minutes at 300° F., the film thickness was 2.0–3.0 mils.

CORVEL® Black 20-7450 is a polyester powder. The specific gravity (calculated) is 1.61. Coverage, square feet per pound per mil is 119. The particle size (Alpine Jet Sieve) using test method ASTM D 3451 (% retained) is: +200 Mesh: 0–8%; +325 Mesh: 30–40%. In a test conducted with electrostatic spray application using test method MPTM 13 on a 4×12 (2 seeds maximum) substrate with a cure schedule of 22 minutes at 385° F., the film thickness was 1.8–3.0 mils.

Salt spray resistance is the traditional corrosion test used by the coating industry. The most commonly used method is ASTM B 117, which exposes the coating to a 5% salt (NaCl) water solution in the form of fog in a cabinet which is maintained at 95° F. and 95% relative humidity. The coated parts are generally cut through (scribed) to the substrate. Coatings are rated for corrosion resistance based on the number of hours required to undercut the coating a specified distance from the scribe.

It is not uncommon to attain 1,000 hours salt spray resistance for a high gloss powder coating applied at 2.0 mils. However, several factors may impact the final salt spray resistance of a coating system. The quality of the substrate and the pretreatment of the substrate are important. If the substrate is not cleaned thoroughly of all oils, scale and other surface contamination, the powder may not properly adhere to the surface, and corrosion resistance may be reduced. The amount of conversion coating, such as zinc or iron phosphate, may have an impact on the product. An excess of conversion coating may reduce the adhesion of the conversion coating to the substrate, thus reducing the adhesion of the powder to the substrate/pretreatment. However, inadequate amounts of conversion may reduce the protection provided by the conversion coating.

The salt spray resistance of a coating may be affected by the film thickness of the applied coating. Although a coating is continuous, it may allow the passage of small amounts of moisture from the environment to the substrate (permeation). A thicker coating may reduce permeability.

The corrosion resistant tube 10 as shown in FIG. 2 is novel and advantageous, in that it substantially eliminates any need for a traditional chromate or equivalent coating/film over the zinc layer 14 (since the powdered material(s) adhere directly to a surface, there is no need to use chromate as an adhesion promoter), thus eliminating the processing and post-processing precautions necessary when working with the toxic chromate solutions. If desired, tube 10 may have subsequent metallic and/or polymeric coatings applied thereto, either by the powder coating method described hereinabove, and/or by any other suitable method, such as extrusion, painting, or any other coating processes described herein or equivalents thereof.

Figure 3:
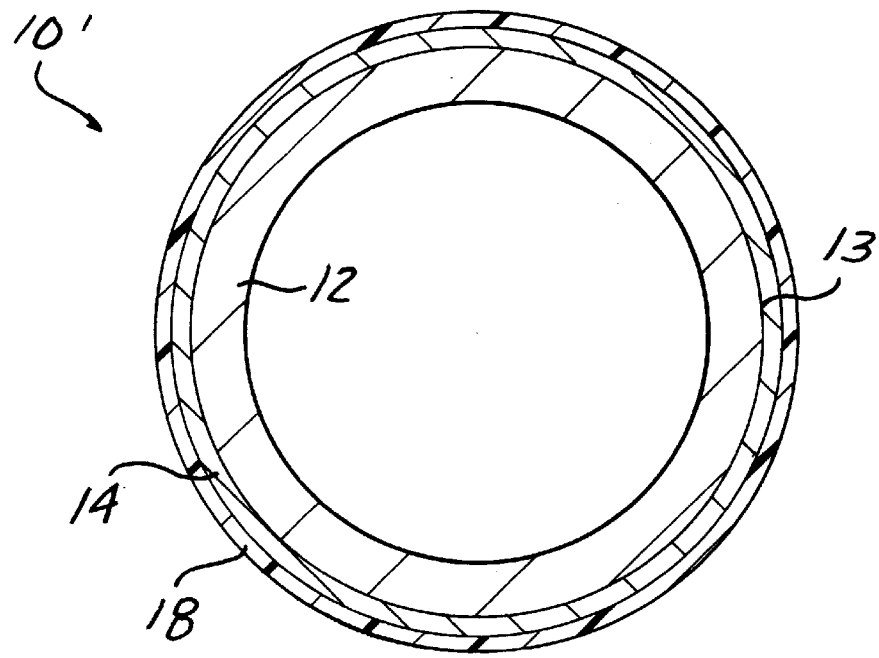
FIG. 3 is a cross-sectional view of tubing according to a second embodiment of the present invention with the layer thicknesses exaggerated for purposes of illustration.

Referring now to FIG. 3, a second embodiment of the corrosion resistant tube of the present invention is designated generally as 10'. In this embodiment, the tube 10' further comprises a polymeric layer 18 electrostatically bonded to the zinc layer 14. It is to be understood that polymeric layer 18 may comprise any suitable powdered polymeric material as suitable and/or desired. However, in the preferred embodiment, polymeric layer 18 is selected from the group consisting of powdered thermoplastic elastomers, powdered polyolefins, powdered nylons, powdered fluoropolymers, powdered polyesters, and mixtures thereof.

It is to be understood that the polymeric layer 18 may be applied in any suitable thickness, however, in the preferred embodiment, layer 18 has a thickness ranging between about 20 microns and about 200 microns, preferably between about 50 microns and about 100 microns, and more preferably has a thickness of about 75 microns.

As illustrative examples, the following materials may be used: powdered polyvinylidene fluoride (PVDF), powdered Nylon 12 (polyamide (PA) 12), powdered Nylon 11 (PA 11), various powdered epoxy materials, and/or mixtures thereof. In the more preferred embodiment, the polymeric layer 18 is selected from the group consisting of powdered PVDF, powdered Nylon 12, powdered Nylon 11, and mixtures thereof.

The following is a brief description of various exemplary, commercially available compounds described hereinabove. It is to be understood that these are examples of suitable compounds for illustrative purposes. Thus, it is to be further understood that other suitable compounds are contemplated and are within the scope of the present invention.

Some suitable PVDF-based powdered materials are commercially available from Crosslink Powder Coatings, Inc. in Clearwater, Fla. under the tradename SERIES 3000. Series 3000 is a semi gloss functional vulcanized fluorinated epoxide based powder coating formulated to offer exceptional elongation, corrosion and chemical resistance at temperatures ranging from sub zero (−160° F.) to 450° F. The material has an average particle size of 20–40 $\mu$m. It can cure at 500° F. for 2 minutes (600° F. being the approximate upper limit). The elongation is 1000% (Instron Tinnis Olson). The material achieved 5,000 hours using Test Method ASTM B 117 Salt Fog (aluminum substrate).

Other suitable PVDF-based powder coatings are commercially available from Herberts Powder Coatings, Inc. in Hilliard, Ohio under the tradename HERBERTS POWDER COATINGS. The color is Burnished Slate. The gloss level is 40–50% @ 60° Specular. Impact using test method ASTM D-2794 is 60 in./lbs., direct and reverse. Adhesion using test method ASTM D-3359 shows no detachment. Flexibility using test method ASTM B-522 is pass ¼ in. mandrel. Humidity using test method ASTM D-2247 shows no blistering. Salt Spray using test method ASTM B-117 shows 0 ⅛ in. creep after 1,000 hours. Hardness using test method ASTM D-3363 is 2 H. U-V resistance shows excellent mechanical properties but prone to chalking on extended exterior exposure, although still retaining all protective qualities. The specific gravity is 1.4 calculated. The film thickness is recommended at 1.5–2.5 mils. The cure schedule is 10 minutes at 450° F. metal temperature or equivalent. This product can be regarded as non-toxic, but precautions should be taken to avoid inhalation of air-borne particles. The melting point is 90–120° C. The percent of volatiles by volume is less than 1 percent using test method ASTM D-2369-86; volatiles are essentially all absorbed water. The appearance was a finely divided powder. The odor detected was slight, if any.

Another suitable powdered fluoropolymer commercially available from Herberts Powder Coatings, Inc. in Hilliard, Ohio is sold under the tradename FLUOROSTAR® PC powder coatings. FLUOROSTAR® PC KYNAR 500PC® resin based powder coatings from Herberts Powder Coatings meet the requirements of AAMA 605.2-90 high performance architectural coatings specification with a completely environmentally friendly system. FLUOROSTAR® PC is a patented, full strength fluorocarbon powder coating. FLUOROSTAR® PC can be applied with ease over either a powder primer or a chromate-free liquid flash primer. The resin contains a minimum of 70% KYNAR 500PC® resin. KYNAR, commercially available from Elf Atochem North America in Philadelphia, Pa., is a vinylidene fluoride-hexafluoropropylene copolymer. Its chemical name is 1-propene,1,1,2,3,3,3-hexafluoro-1,1-difluoroethene polymer.

The gloss of the FLUOROSTAR® PC KYNAR 500PC® was 30±5 units measured at 60°. Colors are available in both standard and custom colors. Film thickness: primer (when used): liquid primer: 0.2–0.6 mils dry film thickness; powder primer: 1.0–1.2 mils dry film thickness. Topcoat: 1.5–2.0 mils dry film thickness. Some typical performance properties include the following. Using test method ASTM D-3363, the pencil hardness performance was F minimum. Using test method ASTM D-3359-83, the adhesion performance showed no pick-off. Using test method ASTM D-2247-80 for 5,000 hours of exposure, the following performances were noted: a chalk rating of 8 to 10 (no chalk) was detected using testing method ASTM D-659-8; the color change was no greater than 5$\Delta$E units after removal of external deposits by using test method ASTM-2244-79; and the gloss retention retains a minimum of 50% of original gloss after removal of external deposits using test method ASTM D-523-80 measured to 60°.

Using test method ASTM D-2247-80 with 3,000 hours of exposure, humidity resistance performance of the FLUOROSTAR® PC KYNAR 500PC® showed no field blisters and no change in pencil hardness after 24 hours. Using test method ASTM B-117-79 with 3,000 hours of exposure resulted in a performance with scribe creep of not more than $\frac{1}{32}$" with no field blisters. Using test method ASTM D-968-87 (Coefficient of Abrasion) resulted in performance with coefficient of abrasion which shall be 50±10 (determined by the number of liters of falling sand required to reach bare metal divided by the number of mils dry film thickness of applied coating). Using test method Kesternich per ISO 3231 resulted in performance of no defects—20 cycles 2.0 liters $SO_2$. Using test method Din 50001/ESS resulted in performance with no defects with 1,000 hours exposure.

A suitable powdered polyamide (PA, ie. nylon) material is commercially available from Creanova Spezialchemie GmbH, a Hüls Group Co. in Marl, Germany under the tradename VESTOSINT®—PA 12 Coating Powder. Coatings of VESTOSINT can be used at temperatures down to −40° C. without altering their properties. They are stable on long-term exposure to heat of up to +80° C., and for brief periods can be heated without damage, in a mechanically unstressed state, to temperatures of up to +160° C. VESTOSINT, and the coatings prepared from it, are inert and can be disposed of by landfill without problems. Given an adequate supply of air, their combustion advantageously and safely forms carbon dioxide, water and nitrogen. VESTOSINT, and coated objects from it, as long as they are of uniform grade, can be recycled. The upper particle-size limit is 250 $\mu$m.

Some typical physical properties of VESTOSINT follow. Melting point using test method DIN 53 736 version B, ISO 1218 is 176° C. The average specific heat using test method DIN 51 005 is 1.2 kJ/kg K. The coefficient of linear expansion using test method DIN 52 328, is $10 \times 10^{-5} K^{-1}$.

The heat conductivity using test method DIN 52 612, 0.24 W/m K. The density at 23° C. using test method DIN 53 479, ISO/R 1183 is 1.02[1] g/cm$^3$. The Shore C hardness using test method DIN 53 505, ISO 868, is 91; while the Shore D hardness using test method DIN 53 505, ISO 868, is 75. The tear strength using test method DIN 53 455, ISO/R 527 is 57 N/mm$^{22}$. Elongation at break using test method DIN 53 455, ISO/R 527 is 300%[3]. The modulus of elasticity using test method DIN 53 457 is 980 N/mm$^2$. The abrasion using test method Taber Abraser CS 17 roller, 1,000 revolutions is 10–15 mg. The maximum water absorption in 20/65 climatic conditioning, using test method DIN 53 495, ISO 62 is 0.9% by mass. Storage in water at 23° C. using test method DIN 53 495, ISO 62 is 1.5% by mass.

[1] Applies to non-pigmented products; for pigmented products the values may be depending on the degree of pigmentation.
[2] Determined using films approximately 300 μm thick, produced from non-pigmented VESTOSINT.
[3] See Note 2.

VESTOSINT is optimized in respect of particle shape, particle size distribution and melt viscosity. It ensures outstanding fluidization properties and thus easy and environmentally compatible coatings in a process which is free from emissions without loss of material.

The coating process results in a composite material which combines the design possibilities of metal processing with the surface quality of the VESTOSINT coating. VESTOSINT provides high-grade properties in terms of corrosion resistance, chemical resistance and/or wear resistance. An adhesion promoter may be used if needed and/or desired. The powders used for fluidized-bed sintering are readily flowable and have a particle size of 30 to 250 μm. They are carefully classified to remove the dust-forming fine fraction.

The amount of VESTOSINT® required depends on the application. It varies between 5 and 20 parts in 100 parts of lacquer. VESTOSINT® molecules have carboxyl endgroups. Therefore dispersions of 10% in water have pH values between 5.5 and 6.0.

VESTOSINT® fine powders are available in different particle size distributions. The median particle size (D 50 value) is between 10 and 60 μm, measured with a laser particle size analyzer. The particle size distribution of several different grades of VESTOSINT® fine powders follows. For VESTOSINT 1115 Polyamide 12 (D 50 value): 50±10 μm For VESTOSINT 1118 Polyamide 12 (D 50 value): 35±3 μm. For VESTOSINT 2154 Polyamide 12 (D 50 value): 65±10 μm. For VESTOSINT 2157 Polyamide 12 (D 50 value): 60±4 μm (this is the grade used in the preferred embodiment). For VESTOSINT 2158 Polyamide 12 (D 50 value): 20±2 μm. For VESTOSINT 2159 Polyamide 12 (D 50 value): 10±2 μm.

A suitable Nylon 11 powdered material is commercially available from Elf Atochem North America in Philadelphia, Pa. under the tradename PA 11 Powder 7268, MAC_ESY. Elf Atochem North America also supplies suitable powdered PVDF materials.

Morton Powder Coatings, Inc. in Reading, Pa. also supplies suitable powdered PVDF and powdered PA 11 materials.

Figure 4:
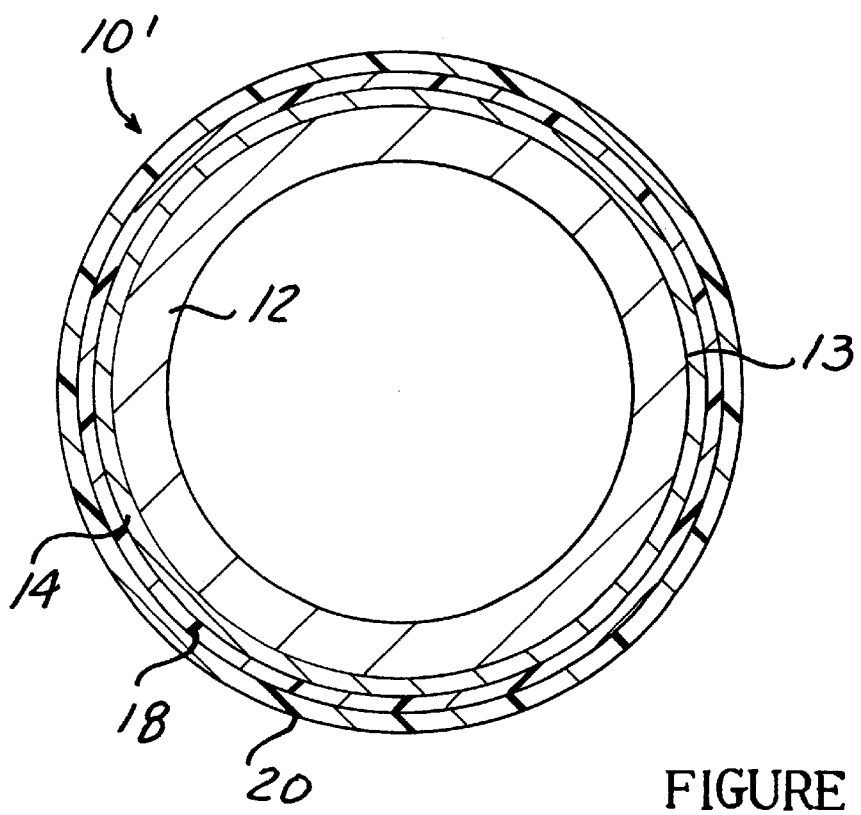
FIG. 4 is a view similar to FIG. 3, showing a second polymeric layer electrostatically bonded to the first polymeric layer.
Figure 5:
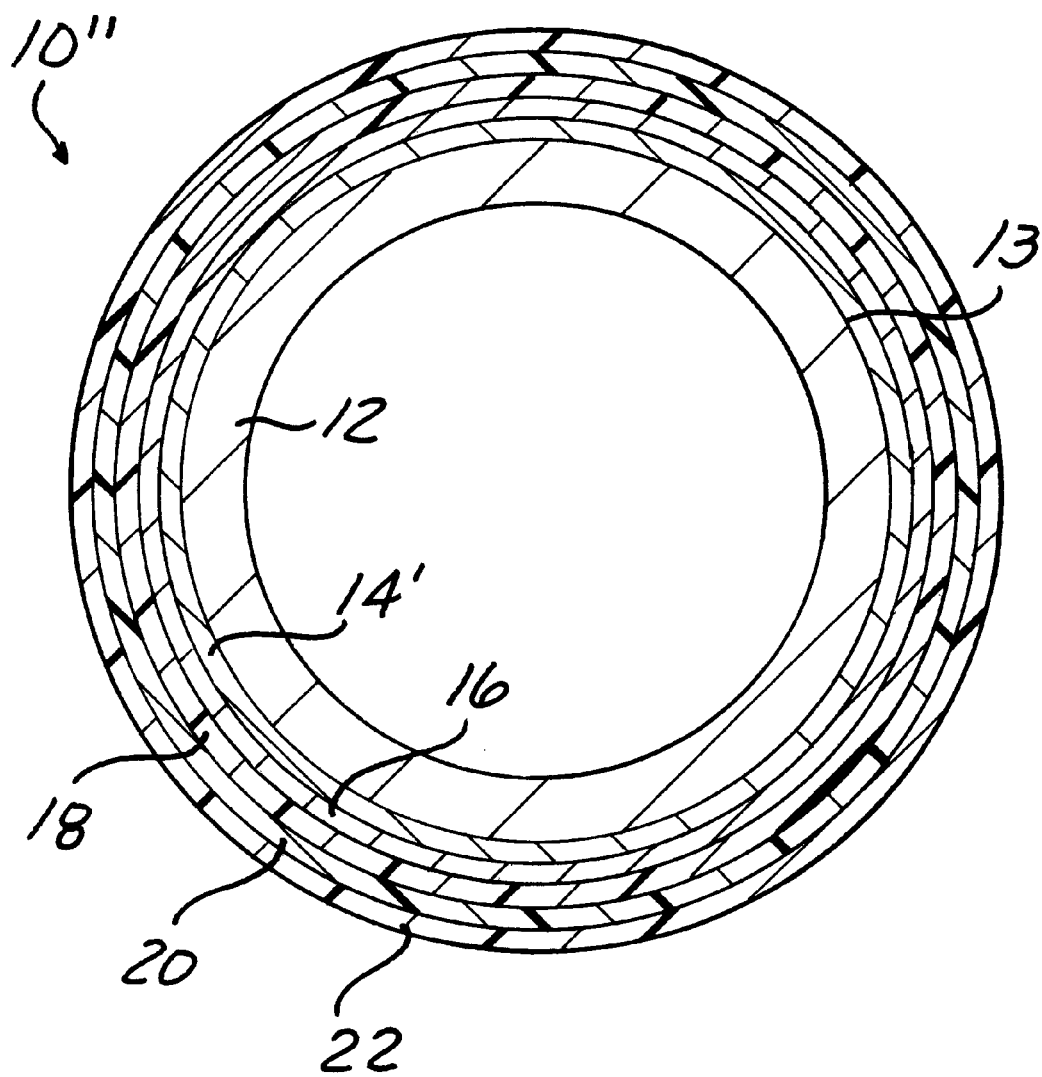
FIG. 5 is a cross-sectional view of tubing according to a third embodiment of the present invention with the layer thicknesses exaggerated for purposes of illustration.

Referring now to FIG. 4, tube 10' may further comprise a second polymeric layer 20 electrostatically bonded to the polymeric layer 18, wherein the second polymeric layer 20 comprises powdered thermoplastic materials selected from the group consisting of powdered nylons, powdered fluoropolymers, powdered polyesters, and mixtures thereof. It is to be understood that any of the polymeric materials mentioned herein with respect to the polymeric layer 18 may also be used as second layer 20. Although not as preferred, if a third polymeric layer 22 is used (as shown in FIG. 5), the third polymeric layer 22 comprises powdered thermoplastic materials selected from the group consisting of powdered nylons, powdered fluoropolymers, powdered polyesters, and mixtures thereof. It is to be understood that any of the polymeric materials mentioned herein with respect to the polymeric layer 18 may also be used as third layer 22.

It is to be understood that any one, or combined polymeric layers may have any suitable thickness as desired. However, in the preferred embodiment, the polymeric layer 18 and the second polymeric layer 20, combined, have a thickness ranging between about 20 microns and about 200 microns, preferably between about 50 microns and about 100 microns, and more preferably has a thickness of about 75 microns. Although not as preferred, the polymeric layer 18 and the second polymeric layer 20, combined, may have a thickness of up to about 300 microns.

In a preferred embodiment, the polymeric layer 18 consists essentially of powdered polyvinylidene fluoride having an average particle size of between about 20 μm and about 30 μm (preferably about 20 μm); and second layer 20 consists essentially of powdered Nylon 12 having an average particle size of between about 20 μm and about 30 μm (preferably about 20 μm). The finer the particle size is, the thinner the film thicknesses may be obtained—generally, the obtainable film thickness is about 3 times to about 3.5 times the average particle size. Further, substantially uniform particle sizes are preferred, as this enables a narrower temperature range necessary for melt/cure.

Referring now to FIG. 5, a third embodiment of the corrosion resistant tube of the present invention is designated generally as 10". Although a second polymeric layer 20 is preferred, and one polymeric layer 18 is more preferred; in the alternate embodiment shown in FIG. 5, three polymeric layers 18, 20 and 22 are used. In other words, it is to be understood that any suitable number of powdered polymeric layers may be used in any of the embodiments disclosed herein; however, one layer 18 or two layers 18 and 20 are preferred. Powdered polymeric layers 18, 20 and 22 (as described above) are electrostatically bonded to a surface treatment layer 16 overlying a zinc layer 14', the zinc layer 14' and surface treatment layer 16 applied to tube 12 as described in detail in U.S. Pat. No. 5,590,691, mentioned hereinabove, or by any other suitable means.

Zinc layer 14', in the preferred embodiment, is selected from the group consisting of zinc plating, zinc nickel alloys, zinc cobalt alloys, zinc aluminum alloys, and mixtures thereof. Surface treatment layer 16 is bonded to the zinc layer 14'. Any suitable surface treatment layer 16 may be used. However, in the preferred embodiment, surface treatment layer 16 is selected from the group consisting of zinc/aluminum/rare earth alloys, phosphates, chromates, and mixtures thereof.

The phosphates and/or chromates may be applied in any suitable manner. In the preferred embodiment, a hot phosphoric acid is used. Without being bound to any theory, it is believed that this acid etches into the metal surface, leaving a phosphate crystalline structure in the metal, which structure aids in subsequent adhesion of polymeric materials. Over electroplating, a wet bath chromate may be used, after which the metal is rinsed well. Chromium oxides are left on the metal, which are believed to aid in corrosion resistance, and which, although optional, are further believed to enhance the advantageous properties of the phosphate. Over the zinc/aluminum/rare earth alloy treatment, a dry chromate may be used which does not require subsequent rinsing.

The zinc/aluminum/rare earth alloy used is preferably GALFAN, commercially available from Eastern Alloys, Inc. in Maybrook, N.Y.; licensed from the International Lead Zinc Research Organization, Inc. located in New York, N.Y.; and described in U.S. Pat. No. 4,448,748, which is incorporated herein by reference in its entirety. Particularly preferred is the combination of the GALFAN with the phosphate, or the GALFAN with the phosphate and chromate. Without being bound to any theory, it is believed that either of these two combinations for the surface treatment layer 16 are particularly advantageous and useful in the present invention.

It is to be understood that one or more powdered polymeric layers may be applied over any metallic corrosion resistant composition applied to an outer surface of metal tube 12.

Figure 6:
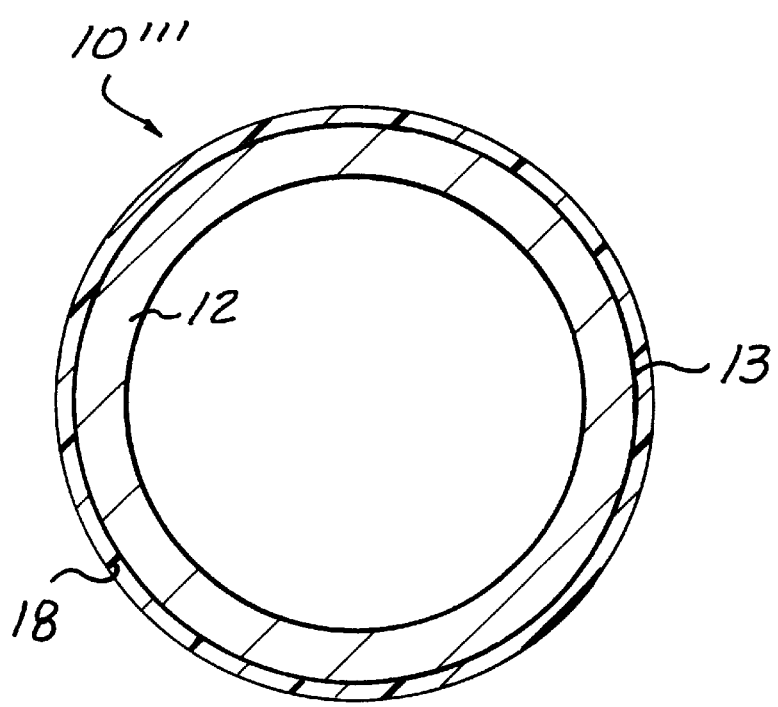
FIG. 6 is a cross-sectional view of tubing according to a fourth embodiment of the present invention with the layer thicknesses exaggerated for purposes of illustration.

Referring now to FIG. 6, a fourth embodiment of the corrosion resistant tube of the present invention is designated generally as 10'''. In this embodiment, polymeric layer 18 is electrostatically bonded to the outer surface 13 of metal tube 12. Although not shown, it is to be understood that any number of subsequent polymeric layers may be applied to layer 18, either electrostatically or by other suitable means. This embodiment may be especially useful for decorative purposes. Further, it is contemplated that various powdered polymeric compounds and/or blends may substantially bond to an untreated metal surface, thereby giving the numerous corrosion and abrasion resistant properties enumerated herein.

It is to be understood that any combination and/or variation of any of the embodiments mentioned herein is contemplated as being within the scope and spirit of the present invention.

Various combinations of corrosion resistant tubing 10 according to the present invention have been prepared with metal tube 12 having a ³⁄₁₆ inch diameter and ¼" brazed tube, or ⁵⁄₁₆ inch, ⅜ inch and ¼" diameter welded steel tube. The process according to the present invention is not size dependent, and therefore it is anticipated that other sizes, including smaller sizes and larger sizes, of metal tube 12 can be processed according to the present invention. Further, tube 12 may be of circular cross section as shown, however, it is to be understood that tube 12 may be formed of any suitable size and/or shape, including square, rectangular and other geometric configurations.

It is to be understood that any or all of the three layers, 18, 20, 22 may include multiple sublayers (not shown). If multiple layers are used, the conductivity of the tube 12 may in some instances be undesirably limited (eg. when used for conveying fuel, if the electrostatic charge is not dissipated adequately, there may be an undesirable and/or hazardous build up of electrostatic charge). In such cases, it may be desirable to include suitable conductive media within suitable polymeric layers. Further, it is to be understood that each of the layers and/or sublayers may be formed from a single compound listed in the relevant group, or from a combination of materials listed in the relevant group. Still further, it is to be understood that the material comprising one of the layers/sublayers may be the same or different from the material comprising any/all of the other layers/sublayers.

One of the advantages of the present invention is that a chemical or mechanical bond is formed between all the layers. It is believed that good bonding prevents moisture buildup beneath the layers, which buildup greatly increases the likelihood of corrosion.

Some advantages of the electrostatic coating of Zn or Zn alloy powder according to the present invention include, but are not limited to the following. The conventional hot dipping process consumes much energy to maintain the molten stage, and is difficult from a maintenance standpoint. The conventional electroplating process must be operated in a relatively lower line speed in order to build up the Zn layer thickness, and also requires a great amount of floor space. The present invention does not require the amount of energy and maintenance as does the hot dip process; and it can be run at higher line speeds while using less floor space than does the electroplating process. The Zn and/or Zn alloy powder coating process of the present invention is clean, simple, fast and efficient, while rendering adequate layer adhesion and utilization of close to 100% of the powder material.

To further illustrate the present invention, the following examples are given, within the context of the discussion of test results found in the table of FIG. 7. It is to be understood that these examples are provided for illustrative purposes and are not to be construed as limiting the scope of the present invention.

EXAMPLES

Referring now to FIG. 7, a table labelled "Powder Coat Testing" lists various test parameters and results of tests which were run. In FIG. 7, "raw" is meant to designate a polymeric layer without a zinc layer underneath (ie. the polymeric layer was applied to a bare, cleaned metal surface); "plated" is meant to designate a polymeric layer with zinc plating (about 13 to about 25 microns) underneath; and "primer" is meant to designate a polymeric layer with zinc plating (as above) and a primer layer (over the zinc plating, the primer layer having a thickness between about 3 microns and about 7 microns, and comprising an epoxy primer from U.S. Paint) underneath. The tube used was a ³⁄₁₆" brazed tube. The "Endform Flare" was an SAE type endform, and "passed" designates that there was no cracking on the flare. The "paint adhesion evaluation" was performed after the tubing was cut and bent. "Passed" re: the HCl emersion designates that there was no rust on the tube, and no delamination of the polymeric layer from the underlying surface.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A corrosion resistant tube, comprising:
   a metal tube having an outer surface; and
   a zinc layer electrostatically bonded to the metal tube outer surface, wherein the zinc layer is selected from the group consisting of powdered zinc; powdered zinc alloys consisting essentially of zinc and a polymeric matrix, or zinc and an epoxy matrix; powdered zinc powdered zinc nickel alloys; powdered zinc cobalt alloys; powdered zinc aluminum alloys; and mixtures thereof.

2. The corrosion resistant tube as defined in claim 1 wherein the zinc layer has a thickness ranging between about 10 microns and about 75 microns.

3. The corrosion resistant tube as defined in claim 1 wherein the zinc layer is a zinc epoxy powder coating.

4. The corrosion resistant tube as defined in claim 3 wherein the zinc epoxy powder coating has a specific gravity (calculated) of 2.94, and a particle size (Alpine Jet Sieve) using test method ASTM D3451 (% retained) of: +200 Mesh: 0–5%; and +325 Mesh: 5–30%.

5. The corrosion resistant tube as defined in claim 3 wherein the zinc epoxy powder coating has a salt spray resistance (vertical scribe) using test method ASTM B 117 of greater than about 4000 hours.

6. A corrosion resistant tube, comprising:
a metal tube having an outer surface; and
zinc layer electrostatically bonded to the metal tube outer surface, wherein the zinc layer has a thickness ranging between about 10 microns and about 75 microns, and wherein the zinc layer is a zinc epoxy powder coating having a specific gravity (calculated) of 2.94, and a particle size (Alpine Jet Sieve) using test method ASTM D3451 (% retained) of: +200 Mesh: 0–5%; and +325 Mesh: 5–30%, and wherein the zinc epoxy powder coating has a salt spray resistance (vertical scribe) using test method ASTM B 117 of greater than about 4000 hours.

7. The corrosion resistant tube as defined in claim 1, further comprising a polymeric layer electrostatically bonded to the zinc layer, wherein the polymeric layer comprises powdered thermoplastic materials selected from the group consisting of powdered nylons, powdered fluoropolymers, powdered polyesters, and mixtures thereof.

8. The corrosion resistant tube as defined in claim 7 wherein the polymeric layer has a thickness ranging between about 20 microns and about 200 microns.

9. The corrosion resistant tube as defined in claim 7, further comprising a second polymeric layer electrostatically bonded to the polymeric layer, wherein the second polymeric layer comprises powdered thermoplastic materials selected from the group consisting of powdered nylons, powdered fluoropolymers, powdered polyesters, and mixtures thereof.

10. The corrosion resistant tube as defined in claim 9 wherein the polymeric layer and the second polymeric layer, combined, have a thickness ranging between about 20 microns and about 200 microns.

11. The corrosion resistant tube as defined in claim 9 wherein the polymeric layer and the second polymeric layer, combined, have a thickness ranging between about 50 microns and about 100 microns.

12. The corrosion resistant tube as defined in claim 9 wherein the polymeric layer and the second polymeric layer, combined, have a thickness of about 75 microns.

13. The corrosion resistant tube as defined in claim 9 wherein the polymeric layer consists essentially of powdered polyvinylidene fluoride.

14. The corrosion resistant tube as defined in claim 13 wherein the powdered polyvinylidene fluoride has an average particle size of between about 20 $\mu$m and about 30 $\mu$m.

15. The corrosion resistant tube as defined in claim 13 wherein the second polymeric layer consists essentially of powdered Nylon 12.

16. The corrosion resistant tube as defined in claim 15 wherein the powdered Nylon 12 has an average particle size of between about 20 $\mu$m and about 30 $\mu$m.

17. A corrosion resistant tube, comprising:
a metal tube having an outer surface;
a zinc layer electrostatically bonded to the metal tube outer surface, wherein the zinc layer has a thickness ranging between about 10 microns and about 75 microns, and wherein the zinc layer is a zinc epoxy powder coating having a specific gravity (calculated) of 2.94, and a particle size (Alpine Jet Sieve) using test method ASTM D3451 (% retained) of: +200 Mesh: 0–5%; and +325 Mesh: 5–30%, and wherein the zinc epoxy powder coating has a salt spray resistance (vertical scribe) using test method ASTM B 117 of greater than about 4000 hours;
a polymeric layer electrostatically bonded to the zinc layer, wherein the polymeric layer comprises powdered thermoplastic materials selected from the group consisting of powdered nylons, powdered fluoropolymers, powdered polyesters, and mixtures thereof; and
a second polymeric layer electrostatically bonded to the polymeric layer, wherein the second polymeric layer comprises powdered thermoplastic materials selected from the group consisting of powdered nylons, powdered fluoropolymers, powdered polyesters, and mixtures thereof.

18. The corrosion resistant tube as defined in claim 17 wherein the polymeric layer and the second polymeric layer, combined, have a thickness ranging between about 75 microns and about 300 microns.

19. The corrosion resistant tube as defined in claim 17 wherein the polymeric layer and the second polymeric layer, combined, have a thickness ranging between about 50 microns and about 80 microns.

20. The corrosion resistant tube as defined in claim 17 wherein the polymeric layer and the second polymeric layer, combined, have a thickness ranging between about 150 microns and about 200 microns.

21. The corrosion resistant tube as defined in claim 17 wherein the polymeric layer consists essentially of powdered polyvinylidene fluoride, and wherein the second polymeric layer consists essentially of powdered Nylon 12.

22. The corrosion resistant tube as defined in claim 21 wherein the powdered polyvinylidene fluoride has an average particle size of between about 20 $\mu$m and about 30 $\mu$m, and wherein the powdered Nylon 12 has an average particle size of between about 20 $\mu$m and about 30 $\mu$m.

23. A corrosion resistant tube, comprising:
a metal tube having an outer surface;
a zinc layer bonded to the metal tube outer surface, wherein the zinc layer is selected from the group consisting of zinc plating, zinc nickel alloys, zinc cobalt alloys, zinc aluminum alloys, and mixtures thereof;
a surface treatment layer bonded to the zinc layer, wherein the surface treatment layer is selected from the group consisting of a zinc/aluminum/rare earth alloy, phosphate, chromate, and mixtures thereof; and
a polymeric layer electrostatically bonded to the surface treatment layer, wherein the polymeric layer comprises powdered thermoplastic materials selected from the group consisting of powdered nylons, powdered fluoropolymers, powdered polyesters, and mixtures thereof.

24. The corrosion resistant tube as defined in claim 23 wherein the polymeric layer has a thickness ranging between about 20 microns and about 200 microns.

25. The corrosion resistant tube as defined in claim 23, further comprising a second polymeric layer electrostatically bonded to the polymeric layer, wherein the second polymeric layer comprises powdered thermoplastic materials selected from the group consisting of powdered nylons, powdered fluoropolymers, powdered polyesters, and mixtures thereof.

26. The corrosion resistant tube as defined in claim 25 wherein the polymeric layer and the second polymeric layer, combined, have a thickness ranging between about 50 microns and about 300 microns.

27. The corrosion resistant tube as defined in claim 25 wherein the polymeric layer and the second polymeric layer, combined, have a thickness ranging between about 50 microns and about 100 microns.

28. The corrosion resistant tube as defined in claim 25 wherein the polymeric layer and the second polymeric layer, combined, have a thickness ranging between about 150 microns and about 200 microns.

29. The corrosion resistant tube as defined in claim 25 wherein the polymeric layer consists essentially of powdered polyvinylidene fluoride.

30. The corrosion resistant tube as defined in claim 29 wherein the powdered polyvinylidene fluoride has an average particle size of between about 20 $\mu$m and about 30 $\mu$m.

31. The corrosion resistant tube as defined in claim 25 wherein the second polymeric layer consists essentially of powdered Nylon 12.

32. The corrosion resistant tube as defined in claim 31 wherein the powdered Nylon 12 has an average particle size of between about 20 $\mu$m and about 30 $\mu$m.

33. A corrosion resistant tube, comprising:
a metal tube having an outer surface;
a zinc layer bonded to the metal tube outer surface, wherein the zinc layer is selected from the group consisting of zinc plating, zinc nickel alloys, zinc cobalt alloys, zinc aluminum alloys, and mixtures thereof;
a surface treatment layer bonded to the zinc layer, wherein the surface treatment layer is selected from the group consisting of a zinc/aluminum/rare earth alloy, phosphate, chromate, and mixtures thereof;
a polymeric layer electrostatically bonded to the surface treatment layer, wherein the polymeric layer is selected from the group consisting of powdered polyvinylidene fluoride, powdered Nylon 12, and mixtures thereof; and
a second polymeric layer electrostatically bonded to the polymeric layer, wherein the second polymeric layer is selected from the group consisting of powdered polyvinylidene fluoride, powdered Nylon 12, and mixtures thereof.

34. The corrosion resistant tube as defined in claim 33 wherein the polymeric layer and the second polymeric layer, combined, have a thickness ranging between about 75 microns and about 300 microns.

35. The corrosion resistant tube as defined in claim 33 wherein the polymeric layer and the second polymeric layer, combined, have a thickness ranging between about 50 microns and about 80 microns.

36. The corrosion resistant tube as defined in claim 33 wherein the polymeric layer and the second polymeric layer, combined, have a thickness ranging between about 150 microns and about 200 microns.

37. The corrosion resistant tube as defined in claim 33 wherein the polymeric layer consists essentially of powdered polyvinylidene fluoride.

38. The corrosion resistant tube as defined in claim 37 wherein the powdered polyvinylidene fluoride has an average particle size of between about 20 $\mu$m and about 30 $\mu$m.

39. The corrosion resistant tube as defined in claim 33 wherein the second polymeric layer consists essentially of powdered Nylon 12.

40. The corrosion resistant tube as defined in claim 39 wherein the powdered Nylon 12 has an average particle size of between about 20 $\mu$m and about 30 $\mu$m.

41. A corrosion resistant metal tube having a metallic corrosion resistant composition applied to an outer surface thereof, the corrosion resistant tube comprising:
a polymeric layer electrostatically bonded to the metallic corrosion resistant composition, wherein the polymeric layer comprises powdered thermoplastic materials selected from the group consisting of powdered nylons, powdered fluoropolymers, powdered polyesters, and mixtures thereof.

42. The corrosion resistant tube as defined in claim 41 wherein the polymeric layer has a thickness ranging between about 20 microns and about 200 microns.

43. The corrosion resistant tube as defined in claim 41, further comprising a second polymeric layer electrostatically bonded to the polymeric layer, wherein the second polymeric layer comprises powdered thermoplastic materials selected from the group consisting of powdered nylons, powdered fluoropolymers, powdered polyesters, and mixtures thereof.

44. The corrosion resistant tube as defined in claim 43 wherein the polymeric layer and the second polymeric layer, combined, have a thickness ranging between about 75 microns and about 300 microns.

45. The corrosion resistant tube as defined in claim 43 wherein the polymeric layer and the second polymeric layer, combined, have a thickness ranging between about 50 microns and about 80 microns.

46. The corrosion resistant tube as defined in claim 43 wherein the polymeric layer and the second polymeric layer, combined, have a thickness ranging between about 150 microns and about 200 microns.

47. The corrosion resistant tube as defined in claim 43 wherein the polymeric layer consists essentially of powdered polyvinylidene fluoride.

48. The corrosion resistant tube as defined in claim 47 wherein the powdered polyvinylidene fluoride has an average particle size of between about 20 $\mu$m and about 30 $\mu$m.

49. The corrosion resistant tube as defined in claim 43 wherein the second polymeric layer consists essentially of powdered Nylon 12.

50. The corrosion resistant tube as defined in claim 49 wherein the powdered Nylon 12 has an average particle size of between about 20 $\mu$m and about 30 $\mu$m.

51. A corrosion resistant metal tube having a metallic corrosion resistant composition applied to an outer surface thereof, the corrosion resistant tube comprising:
a polymeric layer electrostatically bonded to the metallic corrosion resistant composition, wherein the polymeric layer is selected from the group consisting of powdered polyvinylidene fluoride, powdered Nylon 12, and mixtures thereof; and
a second polymeric layer electrostatically bonded to the polymeric layer, wherein the second polymeric layer is selected from the group consisting of powdered polyvinylidene fluoride, powdered Nylon 12, and mixtures thereof.

52. The corrosion resistant tube as defined in claim 51 wherein the polymeric layer and the second polymeric layer, combined, have a thickness ranging between about 75 microns and about 300 microns.

53. The corrosion resistant tube as defined in claim 51 wherein the polymeric layer and the second polymeric layer, combined, have a thickness ranging between about 50 microns and about 80 microns.

54. The corrosion resistant tube as defined in claim 51 wherein the polymeric layer and the second polymeric layer, combined, have a thickness ranging between about 150 microns and about 200 microns.

55. The corrosion resistant tube as defined in claim 51 wherein the polymeric layer consists essentially of powdered polyvinylidene fluoride.

56. The corrosion resistant tube as defined in claim 55 wherein the powdered polyvinylidene fluoride has an average particle size of between about 20 μm and about 30 μm.

57. The corrosion resistant tube as defined in claim 51 wherein the second polymeric layer consists essentially of powdered Nylon 12.

58. The corrosion resistant tube as defined in claim 57 wherein the powdered Nylon 12 has an average particle size of between about 20 μm and about 30 μm.

59. A corrosion resistant tube, comprising:

a metal tube having an outer surface;

a polymeric layer electrostatically bonded to the metal tube outer surface, wherein the polymeric layer comprises powdered thermoplastic materials selected from the group consisting of powdered nylons, powdered fluoropolymers, powdered polyesters, and mixtures thereof; and a second polymeric layer electrostatically bonded to the polymeric layer, wherein the second polymeric layer comprises powdered thermoplastic materials selected from the group consisting of powdered nylons, powdered fluoropolymers, powdered polyesters, and mixtures thereof.

60. The corrosion resistant tube as defined in claim 59 wherein the polymeric layer is selected from the group consisting of powdered polyvinylidene fluoride, powdered Nylon 12, and mixtures thereof, and wherein the second polymeric layer is selected from the group consisting of powdered polyvinylidene fluoride, powdered Nylon 12, and mixtures thereof.

* * * * *